United States Patent [19]

Peille

[11] E Re. 29,416

[45] Reissued Sept. 27, 1977

[54] EQUIPMENT FOR THE CONTINUOUS PRODUCTION OF PANELS OF SYNTHETIC MATERIAL

[75] Inventor: Jean-Marie Raymond Peille, Esperaza, France

[73] Assignee: Societe Industrielle de Stratifies, Esperaza, France

[21] Appl. No.: 667,765

[22] Filed: Mar. 17, 1976

Related U.S. Patent Documents

Reissue of:

[64] Patent No.: 3,841,811
Issued: Oct. 15, 1974
Appl. No.: 224,055
Filed: Feb. 7, 1972

[30] Foreign Application Priority Data

Feb. 12, 1971 France ..... 71.04913

[51] Int. Cl.[2] ..... B29D 27/00

[52] U.S. Cl. ..... 425/115; 425/371; 425/817 C

[58] Field of Search ..... 264/45.4, 45.8, 46.2, 264/46.3, 46.5, 54; 425/4 C, 817 C, 115, 224, 329, 110, 371, 372; 164/278

[56] References Cited

U.S. PATENT DOCUMENTS

| | | | |
|---|---|---|---|
| 3,065,500 | 11/1962 | Berner | 425/4 C |
| 3,080,613 | 3/1963 | Wall et al. | 264/54 X |
| 3,240,846 | 3/1966 | Voelker | 425/817 C X |
| 3,258,812 | 7/1966 | Willy | 425/817 C X |
| 3,298,888 | 1/1967 | Page et al. | 425/110 X |
| 3,377,652 | 4/1968 | Politzen et al. | 425/4 C X |
| 3,423,492 | 1/1969 | Jonell et al. | 425/110 X |
| 3,537,929 | 11/1970 | Keith et al. | 425/4 C X |
| 3,553,300 | 1/1971 | Buff | 425/4 C X |
| 3,775,522 | 11/1973 | Auge | 425/4 C X |

*Primary Examiner*—Francis S. Husar
*Assistant Examiner*—Mark Rosenbaum
*Attorney, Agent, or Firm*—Seidel, Gonda & Goldhammer

[57] ABSTRACT

The invention relates to an equipment for the production of panels from expandable synthetic material on which a foil material is applied to act as a facing.

1 Claim, 1 Drawing Figure

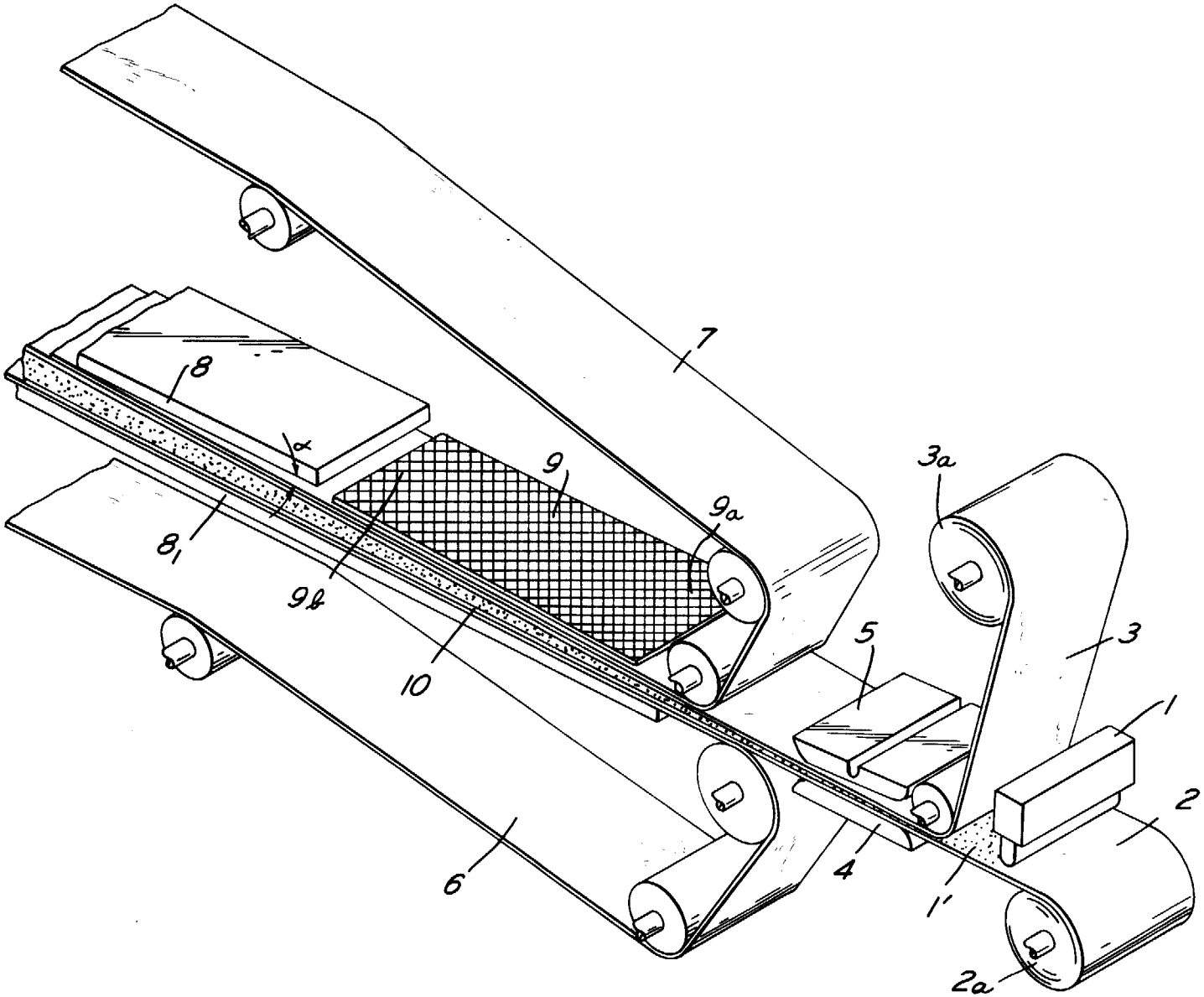
1
2
3
2a
3a
1'
4
5
7
9a
9
9b
10
6
8
8'

EQUIPMENT FOR THE CONTINUOUS PRODUCTION OF PANELS OF SYNTHETIC MATERIAL

Matter enclosed in heavy brackets [ ] appears in the original patent but forms no part of this reissue specification; matter printed in italics indicates the additions made by reissue.

BACKGROUND OF THE INVENTION

The invention relates in general to an equipment for the continuous production of panels of plastic material from expandable or non-expandable resin, coated with at least one facing.

DESCRIPTION OF PRIOR ART

Equipment of the manufacture of panels in particular of synthetic material of the expanded type is already known. In such equipment, means are provided to enable the synthetic material intended to become the core of the panel to be cast in the liquid state. The resin is spread over a first facing consisting of a support foil driven so as to advance at a constant speed. The resin, whether expandable or not, is then coated with a second facing which consists of a foil which simultaneously unrolls itself at the same speed as the support facing. The complex thus formed passes into a first shaping device, then into a belt conveyor where the shaping and the [polymeriasation] *polymerization* of the panel takes place, these panels then being capable of being cut out and worked.

The conveyor device and the shaping device consist of endless belts placed above and below the plane of movement of the panel and these enable the facings to be applied onto the synthetic material. It has been found that with such equipment certain difficulties are encountered in the course of producing panels of expanded material, in particular in regard to the application of the facings onto the liquid reactant in the course of its expansion. In the known equipment it is found that the reactant expands freely between the facings immediately on leaving the first shaper.

The cellular material is then calibrated by the double belt conveyor assembly as indicated above, the expansion of the cellular material having taken place almost completely before entering said conveyor and shaper assembly.

In view of the fact that the surfaces are not completely planar due to longitudinal stresses in the foils constituting the facings, folds have a tendency to appear at the point of contact of the panel obtained with the belts of the conveyor and with the calibrating plates which are applied onto the inner face of said calibrating belts.

Pockets of gas form inside the folds which degrade the cellular matter.

SUMMARY OF THE INVENTION

The object of the present invention is therefore to prevent the formation of folds on the facings of panels of which the core consists of expandable or non-expandable synthetic material. To this end the invention relates to an equipment for the continuous production of panels of plastic material, the equipment being characterized in that the transporter belts which maintain the facings on the synthetic material extend up to the immediate neighbourhood of the exit of the first shaper which introduces the still liquid synthetic material and its two facings between the endless belts of a conveyor to form a holding and continuous calibrating device, a matting which is flexible and deformable in all directions being applied onto the outer face of the transporter belt which bears on the upper facing to prevent the formation of folds.

BRIEF DESCRIPTION OF THE DRAWING

An equipment according to the invention is illustrated on the single accompanying FIGURE which partially shows the working area of the equipment in accordance with the characteristics of the present invention.

GENERAL DESCRIPTION OF PREFERRED EMBODIMENT

According to the invention, as is illustrated on the accompanying drawing, the equipment for the continuous production of panels of synthetic material includes from beginning to end, one or a number of fixed or mobile casting heads for the distribution of the synthetic material. In the example illustrated, [th] *the* process shown is for obtaining panels, for instance, with a core consisting of expandable synthetic material.

The mixture 1 to be expanded in the form of a liquid reactant is distributed on the foil 2 designed to constitute the underneath facing of the panel. The foil 2 moves continuously. A second foil 3 is unrolled and applied onto the liquid reactant to constitute the upper facing of the panel. The facings 2 and 3 form a sheath designed to contain the mixture during its expansion. The foils 2 and 3 are drawn for example between the two surfaces 4 and 5 which are suitably profiled and constitute a first shaper to spread and shape the mixture.

According to the present invention, the transporter belts 6 and 7 which are applied onto each of the faces of the facings 2 and 3 extend in a direction opposite to the direction of the movement of the material to be expanded so as to take charge of said material immediately on its leaving the profiles 4 and 5 while the mixture to be expanded is still in a liquid state.

According to another characteristic of the invention, the transporter belts 6 and 7 are thin and flexible and made preferably of diethylene glycol terephthalate.

The pressure exerted on the belt 7 is adjustable in accordance with requirements in order to ensure a tangential contact on the facing 3 in contact with the upper face 10 of the core of expanded cellular material by means of a shaping plate 8.

It is at the point of contact of the upper shaping plate 8 with the facing 3 that sometimes, in the known devices, folds form which cause the appearance of gas pockets which are difficult to eliminate with any fold remover or discontinuous shaper.

According to a characteristic of the present invention, the elimination of the folds is effected by continuous shaping of the cellular synthetic material from its distribution in its liquid phase to its calibrated expansion phase.

This continuous shaping is obtained principally by the action of the upper transporter belt 7 which is maintained against the facing 3 by the action of a matting 9 which is flexible and deformable in all directions, the part before this matting being fixed immediately after the exit point of the profiles 4 and 5, the zone in which the cellular material is still in its liquid state.

The matting 9 consists with advantage of a metal wire meshing which can take up the shape of all the irregularities of the profiles whatever their shape or orientation.

The matting which is flexible and deformable in all directions forms, on account of the expansion of the cellular material, an inclined plane which guides the transporter belt 7 and maintains it constantly applied against the facing 3 during the expansion of the cellular material.

On completion of the expansion of the cellular material introduced between the facings 2 and 3 by the transporter belts 6 and 7 it is then guided between two horizontal calibrating plates 8 and $8_1$, the distance apart of which being adjustable in accordance with the thickness required for the panel of expanded material.

Contact between the plates 8, $8_1$ and the facings of the material is established between the parallel faces of said plates, the angel $\beta$ between the contact phase of plate 8 and the cellular matter being as small as possible.

By this means, the formation of folds on the facing 3 is made impossible between the input extremity of the matting 9 and the point of contact of the shaping plates 8 and $8_1$, given that the free space between the extremity of the matting and the plates is infinitely small.

It is obvious that the invention is not limited by the example of its application hereinabove described and illustrated and that on the basis of it other forms and modes of application can be envisaged within the scope of the invention.

What I claim is:

[1. An apparatus for the continuous manufacture of panels comprised of expanded synthetic material of the type where a facing is applied to each side of the synthetic material comprising a flow path along which said panels are manufactured, means for supplying said upper and lower facings in continuous sheets along said flow path, means for depositing said synthetic material between said sheets while it is substantially in its liquid phase, first means for shaping said synthetic material, said first means being disposed in contact with each of said facing sheets and having an outlet through which said facing sheets pass, second means for shaping said synthetic material, said second means comprising first and second conveyor bands which are disposed above and below said flow path and which are in engagement with said upper and lower facing, said bands extending downstream from said outlet of said first means so that as said synthetic material expands its shape is maintained by said conveyor bands, and a flexible mesh form belt, the downstream end portion of said belt being deformable in all directions, said belt being applied to the outer surface of the conveyor band above said flow path to prevent the formation of pockets and folds between the facings sheets and the expanded synthetic material.]

[2. An apparatus as defined in claim 1 including first and second shaping plates disposed above and below said upper and lower conveyor bands and in contact therewith, said flexible mesh form belt extending from substantially the entrance of said facing sheets into said conveyor bands to said shaping plate disposed above said upper conveyor, the upstream portion of said flexible mesh form belt overlying that part of said flow path where said synthetic material is still in its liquid state, the downstream portion of said flexible mesh form belt overlying that part of said flow path where the synthetic material is undergoing expansion, and the distance between the downstream end of said flexible mesh form belt and the upstream end of said shaping plate disposed above said conveyor is as small as possible to reduce the angle between the contacting face of said shaping plate and the facing sheet in contact therewith so that pockets and folds cannot form between said flexible mesh form belt and said shaping plate.]

*3. An apparatus for the continuous manufacture of panels comprised of expanded synthetic material of the type where a facing is applied to the upper and lower sides of the synthetic material comprising a flow path along which said panels are manufacture, means adjacent said flow path for supplying said upper and lower facings in continuous sheets along said flow path, means adjacent said supplying means for depositing said synthetic material between said sheets while said synthetic material is substantially in its liquid phase, first means for shaping said synthetic material, said first means being disposed in contact with each of said facing sheets and having an outlet through which said facing sheets pass, second means for shaping said synthetic material, said second means comprising first and second conveyor bands which are disposed above and below said flow path and which are in engagement with said upper and lower facing, said bands extending downstream from said outlet of said first means so that as said synthetic material expands, its shape is maintained by said conveyor bands, first and second shaping plates disposed above and below said upper and lower conveyor bands and in contact therewith, a flexible mesh form belt being applied to the outer surface of said first conveyor band, said belt extending from substantially the entrance of said facing sheets into said conveyor bands to said shaping plate disposed above said upper conveyor, the upstream portion of said flexible mesh form belt overlying that part of said flow path where said synthetic material is still in its liquid state, the downstream portion of said flexible mesh form belt being* *deformable in all directions and overlying that part* *of said flow path where the synthetic material is undergoing expansion, and the distance between the downstream end of said flexible mesh form belt and the upstream end of said shaping plate disposed above said conveyor is as small as possible to reduce the angle between the contacting face of said shaping plate and the facing sheet in contact therewith so that pockets and folds cannot form between said flexible mesh form belt and said shaping plate.*

* * * * *